(12) United States Patent
Inoue et al.

(10) Patent No.: US 9,784,980 B2
(45) Date of Patent: Oct. 10, 2017

(54) OPTICAL MODULE AND LIGHT EXPOSURE DEVICE

(71) Applicant: HAMAMATSU PHOTONICS K.K., Hamamatsu-shi, Shizuoka (JP)

(72) Inventors: Takashi Inoue, Hamamatsu (JP); Hirotoshi Terada, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 185 days.

(21) Appl. No.: 14/782,015

(22) PCT Filed: Mar. 25, 2014

(86) PCT No.: PCT/JP2014/058277
§ 371 (c)(1),
(2) Date: Oct. 2, 2015

(87) PCT Pub. No.: WO2014/162924
PCT Pub. Date: Oct. 9, 2014

(65) Prior Publication Data
US 2016/0062128 A1 Mar. 3, 2016

(30) Foreign Application Priority Data
Apr. 5, 2013 (JP) .................................. 2013-079803

(51) Int. Cl.
*G02B 27/10* (2006.01)
*G02B 27/28* (2006.01)
(Continued)

(52) U.S. Cl.
CPC ........ *G02B 27/1006* (2013.01); *B23K 26/064* (2015.10); *B23K 26/067* (2013.01);
(Continued)

(58) Field of Classification Search
CPC ........................ G02B 27/1006; G02B 27/283; G02B 27/286; G02F 1/135; B23K 26/064; B23K 26/067
(Continued)

(56) References Cited

U.S. PATENT DOCUMENTS 5,552,840 A  9/1996 Ishii et al.
5,701,201 A  12/1997 Okazaki
(Continued)

FOREIGN PATENT DOCUMENTS

CA  2 336 553  1/2007
CN  1441279  9/2003
(Continued)

OTHER PUBLICATIONS

P. Prieto et al., "Adaptive optics with a programmable phase modulator: applications in the human eye," Optical Society of America (OSA), Optics Express, vol. 12, No. 17, Aug. 23, 2004, pp. 4059-4071.
(Continued)

*Primary Examiner* — Samuel M Heinrich
(74) *Attorney, Agent, or Firm* — Drinker Biddle & Reath LLP

(57) ABSTRACT

An optical module (1A) includes a polarization beam splitter (10A), polarization elements (20 and 40) having nonreciprocal optical activity and respectively arranged on an optical path of a first polarization component (L2) transmitted through a light splitting surface (11) in irradiation light (L1) and an optical path of a second polarization component (L4) reflected in the light splitting surface (11), a first reflective SLM (30) that modulates and reflects a first polarization component (L2) passing through the first polarization element (20), and a second reflective SLM (50) that modulates and reflects the second polarization component (L4) passing through the second polarization element (40). First modu-
(Continued)

lation light (L3) passing through the polarization element (20) again and then reflected by the light splitting surface (11) and second modulation light (L5) passing through the polarization element (40) again and then transmitted through the light splitting surface (11) are combined with each other.

10 Claims, 8 Drawing Sheets

(51) Int. Cl.
  *G02F 1/135*   (2006.01)
  *B23K 26/067*   (2006.01)
  *B23K 26/064*   (2014.01)
  *G02B 27/09*   (2006.01)
  *B23K 26/06*   (2014.01)

(52) U.S. Cl.
  CPC ...... *B23K 26/0648* (2013.01); *B23K 26/0676* (2013.01); *G02B 27/0905* (2013.01); *G02B 27/283* (2013.01); *G02B 27/286* (2013.01); *G02F 1/135* (2013.01)

(58) Field of Classification Search
  USPC ............... 219/121.6, 121.73; 250/225, 492.1
  See application file for complete search history.

(56) References Cited

U.S. PATENT DOCUMENTS

| | | | |
|---|---|---|---|
| 6,625,181 B1 * | 9/2003 | Oshemkov | B23K 26/067 219/121.68 |
| 6,742,897 B1 | 6/2004 | Tajiri | |
| 6,924,893 B2 | 8/2005 | Oldenbourg et al. | |
| 7,148,936 B1 | 12/2006 | Hirota et al. | |
| 7,990,611 B2 | 8/2011 | Betzig | |
| 8,957,349 B2 * | 2/2015 | Matsumoto | B41J 2/442 219/121.6 |
| 2003/0230710 A1 | 12/2003 | Wolleschensky et al. | |
| 2012/0147280 A1 | 6/2012 | Osterman et al. | |

FOREIGN PATENT DOCUMENTS

| | | |
|---|---|---|
| CN | 101191990 | 6/2008 |
| CN | 101606097 | 12/2009 |
| CN | 102385151 | 3/2012 |
| EP | 2 109 793 | 10/2009 |
| JP | S64-079722 | 3/1989 |
| JP | 2000-019455 A | 1/2000 |
| JP | 2001-091842 A | 4/2001 |
| JP | 2004-102225 A | 4/2004 |
| JP | 2005-144524 A | 6/2005 |
| JP | 2008-276043 A | 11/2008 |
| JP | 2010-518431 A | 5/2010 |
| JP | 4877963 | 2/2012 |
| JP | 5090783 | 12/2012 |
| WO | WO 01/37029 | 5/2001 |
| WO | WO 2008/010532 | 1/2008 |
| WO | WO 2008/095609 | 8/2008 |
| WO | WO-2008-105312 A1 | 9/2008 |

OTHER PUBLICATIONS

X. Zeng et al., "Parallel lensless optical correlator based on two phase-only spatial light modulators," Optical Society of America (OSA), Optics Express, vol. 19, No. 13, Jun. 20, 2011, pp. 12594-12604.

* cited by examiner

OPTICAL MODULE AND LIGHT EXPOSURE DEVICE

TECHNICAL FIELD

The present invention relates to an optical module and a light irradiation apparatus.

BACKGROUND ART

In Patent Literature 1, a laser machining apparatus including a reflective spatial light modulator is described. This laser machining apparatus includes a laser light source and a spatial light modulator, and a polarization beam splitter is arranged on an optical path between the laser light source and the spatial light modulator. Further, a Faraday rotator is arranged on an optical path between the polarization beam splitter and the spatial light modulator.

In this laser machining apparatus, light output from the laser light source is transmitted through the polarization beam splitter and reaches the spatial light modulator via the Faraday rotator, and a phase or amplitude of the light is modulated. Also, the light after the modulation passes through the Faraday rotator and reaches the polarization beam splitter again. Here, the Faraday rotator rotates a polarization plane 45° in a forward path, and rotates the polarization plane 45° in the same rotation direction in a backward path. Accordingly, the light reaching the polarization beam splitter again is reflected by the polarization beam splitter since the polarization plane thereof is rotated 90°.

In Patent Literature 2, a phase modulation system including a reflective phase modulator is described. This phase modulation system includes a polarization beam splitter arranged on an optical path of light input on the phase modulator, and a Faraday rotator arranged between the phase modulator and the polarization beam splitter. In this phase modulation system, light is modulated through the same operation as that in the laser machining apparatus described in Patent Literature 1.

CITATION LIST

Patent Literature

Patent Literature 1: Japanese Unexamined Patent Application Publication No. 2005-144524

Patent Literature 2: PCT Japanese Translation Patent Publication No. 2010-518431

SUMMARY OF INVENTION

Technical Problem

In recent years, a technology for modulating an intensity distribution or a phase distribution of irradiation light using a spatial light modulator (SLM) in order to realize the irradiation light in various forms in a light irradiation apparatus has been studied. For example, in apparatuses described in Patent Literatures 1 and 2, a phase of light is modulated using a single SLM. However, in a light irradiation apparatus such as a laser machining apparatus, it is desirable for an irradiation target to be simultaneously irradiated with a plurality of beams of light subjected to various modulations by a plurality of SLMs in order to realize a wider variety of irradiation forms in the irradiation target. Using such irradiation forms, the same position is irradiated with light with different gathering depths, or the irradiation target is simultaneously irradiated with a plurality of beams of light with different irradiation conditions such as a pulse width or a repetition frequency. It is possible to provide a user with a wider variety of irradiation forms.

The present invention has been made in view of such points, and an object thereof is to provide an optical module and a light irradiation apparatus capable of providing a user with a wider variety of irradiation forms.

Solution to Problem

In order to solve the above problems, a first optical module according to the present invention is an optical module for modulating irradiation light output from a light source to generate modulation light and supplying the modulation light to an irradiation target in a light irradiation apparatus, the optical module including: a polarization beam splitter including a light splitting surface for reflecting an s-polarization component included in the irradiation light and transmitting a p-polarization component; a first polarization element having nonreciprocal optical activity to rotate a polarization plane, and arranged on an optical path of a first polarization component transmitted through the light splitting surface in the irradiation light; a first reflective SLM for modulating the first polarization component passing through the first polarization element to generate first modulation light, and reflecting the first modulation light to the first polarization element; a second polarization element having nonreciprocal optical activity to rotate a polarization plane, and arranged on an optical path of a second polarization component reflected by the light splitting surface in the irradiation light; and a second reflective SLM for modulating the second polarization component passing through the second polarization element to generate second modulation light, and reflecting the second modulation light to the second polarization element, wherein the first modulation light passing through the first polarization element again and then reflected by the light splitting surface and the second modulation light passing through the second polarization element again and then transmitted through the light splitting surface are combined with each other, output from the polarization beam splitter, and output to the irradiation target as the modulation light.

In the first optical module, the polarization plane of the first polarization component (p-polarization component) transmitted through the polarization beam splitter is rotated by the first polarization element, and then the first polarization component is input to the first reflective SLM. The first polarization component is modulated by the first reflective SLM to be the first modulation light, and the polarization plane of the first modulation light is rotated again by the first polarization element. Since the first polarization element has nonreciprocal optical activity, the first modulation light reciprocating through the first polarization element in this way can include the s-polarization component reflected in the polarization beam splitter. Further, preferably, the polarization plane of the first polarization component before modulation may be rotated 45° by the first polarization element, and the polarization plane of the first modulation light after modulation may be further rotated 45° by the first polarization element.

Further, the polarization plane of the second polarization component (s-polarization component) reflected in the polarization beam splitter is rotated by the second polarization element, and then the second polarization component is input to the second reflective SLM. The second polarization component is modulated by the second reflective SLM to be the second modulation light, and the polarization plane of the second modulation light is rotated again by the second polarization element. Since the second polarization element has nonreciprocal optical activity, the second modulation light reciprocating the second polarization element in this way may include a p-polarization component transmitted through the polarization beam splitter. Further, preferably, the polarization plane of the second polarization component before modulation may be rotated 45° by the second polarization element, and the polarization plane of the second modulation light after modulation may be further rotated 45° by the second polarization element.

Thereafter, the first modulation light including the s-polarization component is reflected in the polarization beam splitter, and the second modulation light including the p-polarization component is transmitted through the polarization beam splitter. This modulation light is combined and output from the polarization beam splitter.

As described above, in the first optical module, the p-polarization component and the s-polarization component of the input light can be separated and then modulated, and the first and second modulation light after modulation can be combined and output. Therefore, according to the first optical module, it is possible to provide a user with a wider variety of irradiation forms. For example, different gathering depths are applied to the first and second modulation light, or different irradiation conditions such as a pulse width or a repetition frequency are applied.

Further, in some cases, only a linear polarization component can be modulated by the configuration of the SLM such as a liquid crystal type SLM. In such cases, for example, when other polarization components are not used as in the configurations described in Patent Literatures 1 and 2, light use efficiency (a ratio of intensity of light output from the light source and intensity of light with which the irradiation target is irradiated) is suppressed to be small. On the other hand, according to the first optical module, it is possible to effectively use both the s-polarization component and the p-polarization component of the irradiation light, and thus to effectively increase the light use efficiency.

Further, in the first optical module, the first and second reflective SLMs may be liquid crystal types, and an alignment direction of liquid crystal of the first reflective SLM and an alignment direction of liquid crystal of the second reflective SLM may be orthogonal to each other. Thus, it is possible to efficiently modulate the first and second polarization components having orthogonal polarization planes in the first and second reflective SLMs, respectively.

Further, the first optical module may further include: a polarization element having reciprocal optical activity, and arranged on an optical path between the polarization beam splitter and the first reflective SLM or on an optical path between the polarization beam splitter and the second reflective SLM. Thus, an angle of the polarization plane of the first polarization component immediately before the first polarization component is input to the first reflective SLM, or an angle of the polarization plane of the second polarization component immediately before the second polarization component is input to the second reflective SLM can be arbitrarily controlled.

Further, the first light irradiation apparatus according to the present invention may include: any one of the first optical modules; a light source for outputting the irradiation light to the optical module; and a light-guiding optical system for guiding the modulation light output from the optical module to the irradiation target. According to the first light irradiation apparatus, by including the first optical module described above, it is possible to provide a user with a wider variety of irradiation forms and also to increase light use efficiency of the irradiation light.

A second optical module according to the present invention is an optical module for modulating irradiation light output from a light source to generate modulation light and supplying the modulation light to an irradiation target in a light irradiation apparatus, the optical module including: a first polarization beam splitter including a light splitting surface for reflecting an s-polarization component and transmits a p-polarization component, and for receiving first irradiation light including the p-polarization component using the light splitting surface; a first polarization element having nonreciprocal optical activity to rotate a polarization plane, and arranged on an optical path of the first irradiation light transmitted through the light splitting surface of the first polarization beam splitter; a first reflective SLM for modulating the first irradiation light passing through the first polarization element to generate first modulation light, and reflecting the first modulation light to the first polarization element; a second polarization beam splitter including a light splitting surface for reflecting the s-polarization component and transmitting the p-polarization component, and for receiving second irradiation light including any one of the s-polarization component and the p-polarization component using the light splitting surface; a second polarization element having nonreciprocal optical activity to rotate a polarization plane, and arranged on an optical path of the second irradiation light subjected to one of transmission and reflection in the light splitting surface of the second polarization beam splitter; and a second reflective SLM for modulating the second irradiation light passing through the second polarization element to generate second modulation light, and reflecting the second modulation light to the second polarization element, wherein the first modulation light passes through the first polarization element again and then is reflected in the light splitting surface of the first polarization beam splitter, and the second modulation light passes through the second polarization element again and then reaches the light splitting surface of the first polarization beam splitter through the other of the transmission and the reflection in the light splitting surface of the second polarization beam splitter, and the first and second modulation light is combined, output from the first polarization beam splitter, and output to the irradiation target as the modulation light.

The polarization plane of the first irradiation light transmitted through the first polarization beam splitter is rotated by the first polarization element, and then the first irradiation light is input to the first reflective SLM. The first irradiation light is modulated by the first reflective SLM to be the first modulation light, and the polarization plane of the first modulation light is rotated again by the first polarization element. Since the first polarization element has nonreciprocal optical activity, the first modulation light reciprocating through the first polarization element in this way can include the s-polarization component reflected in the polarization beam splitter. Further, preferably, the polarization plane of the first irradiation light before modulation may be rotated 45° by the first polarization element, and the polarization plane of the first modulation light after modulation may be further rotated 45° by the first polarization element.

Further, the polarization plane of the second irradiation light subjected to one of transmission and reflection in the second polarization beam splitter is rotated by the second polarization element, and then the second irradiation light is input to the second reflective SLM. The second irradiation light is modulated by the second reflective SLM to be the second modulation light, and the polarization plane of the second modulation light is rotated again by the second polarization element. Since the second polarization element has nonreciprocal optical activity, the second modulation light reciprocating the second polarization element in this way reaches the light splitting surface of the first polarization beam splitter through the other of the transmission and the reflection in the polarization beam splitter. Further, preferably, the polarization plane of the second irradiation light before modulation may be rotated 45° by the second polarization element, and the polarization plane of the second modulation light after modulation may be further rotated 45° by the second polarization element.

Thereafter, the first modulation light including the s-polarization component is reflected in the first polarization beam splitter, combined with the second modulation light reaching the light splitting surface of the first polarization beam splitter, and output from the polarization beam splitter.

As described above, in the second optical module, the first and second irradiation light can be individually modulated, and the first and second modulation light after modulation can be combined and output. Therefore, according to the second optical module, it is possible to provide a user with a wider variety of irradiation forms. For example, different gathering depths are applied to the first and second modulation light, or different irradiation conditions such as a pulse width or a repetition frequency are applied.

Further, the second optical module may further include: an optical path length adjustment element provided on an optical path between the first polarization beam splitter and the first reflective SLM.

Further, the second optical module may further include: a polarization element having reciprocal optical activity and provided on an optical path between the first polarization beam splitter and the second polarization beam splitter. Thus, the polarization plane of the second modulation light reflected in the light splitting surface of the second polarization beam splitter can be rotated and transmitted through the light splitting surface of the first polarization beam splitter.

Further, the second light irradiation apparatus according to the present invention include any one of the second optical modules; one or two or more light sources for outputting the first and second irradiation light to the optical module; and a light-guiding optical system for guiding the modulation light output from the optical module to the irradiation target. According to the second light irradiation apparatus, by including the second optical module described above, it is possible to provide a user with a wider variety of irradiation forms.

Further, the second light irradiation apparatus may further include: a first spectroscopic element arranged on an optical path of the first irradiation light, and for splitting the first irradiation light based on wavelength components or polarization components; and a second spectroscopic element arranged on an optical path of the second irradiation light, and for splitting the second irradiation light based on wavelength components or polarization components.

Further, the second light irradiation apparatus may further include a ½-wavelength plate, and the ½-wavelength plate may be arranged on at least one of an optical path of the first irradiation light and an optical path of the second irradiation light.

Advantageous Effects of Invention

According to the present invention, it is possible to provide an optical module and a light irradiation apparatus capable of providing a user with a wider variety of irradiation forms.

DESCRIPTION OF EMBODIMENTS

Hereinafter, embodiments of the optical module and the light irradiation apparatus according to the present invention will be described in detail with reference to the accompanying drawings. Further, in the description of the drawings, the same elements are denoted with the same reference signs, and repeated description will be omitted.

First Embodiment

Figure 1:
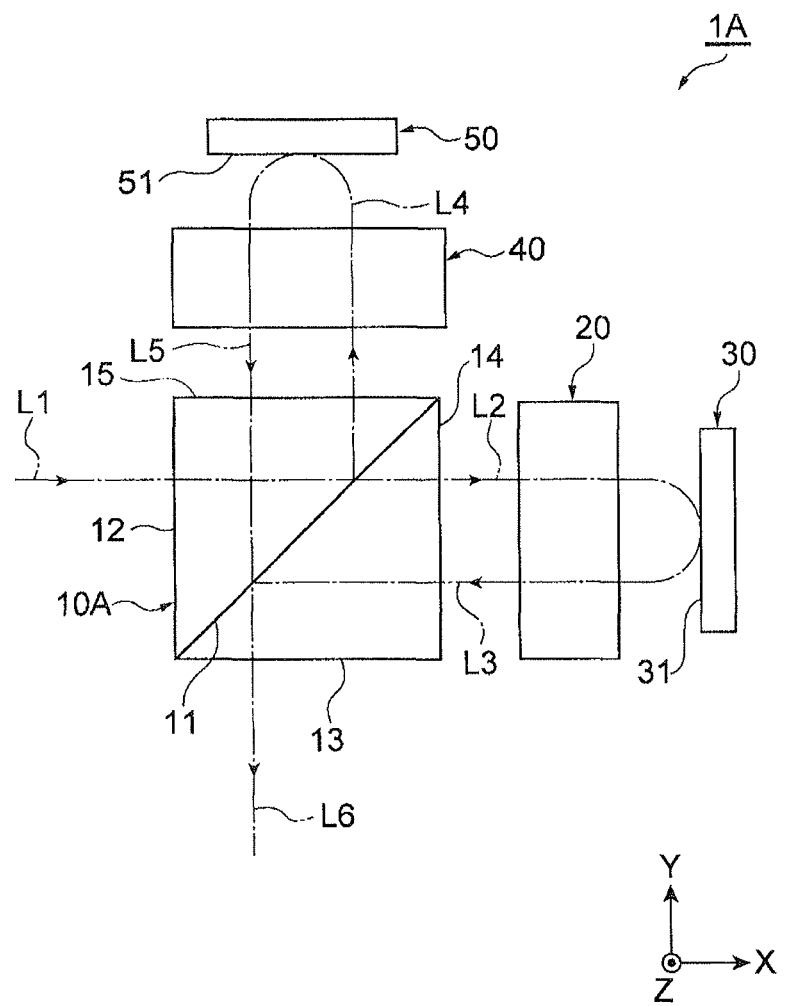
FIG. 1 is a diagram illustrating a configuration of an optical module according to a first embodiment of the present invention.
Figure 2:
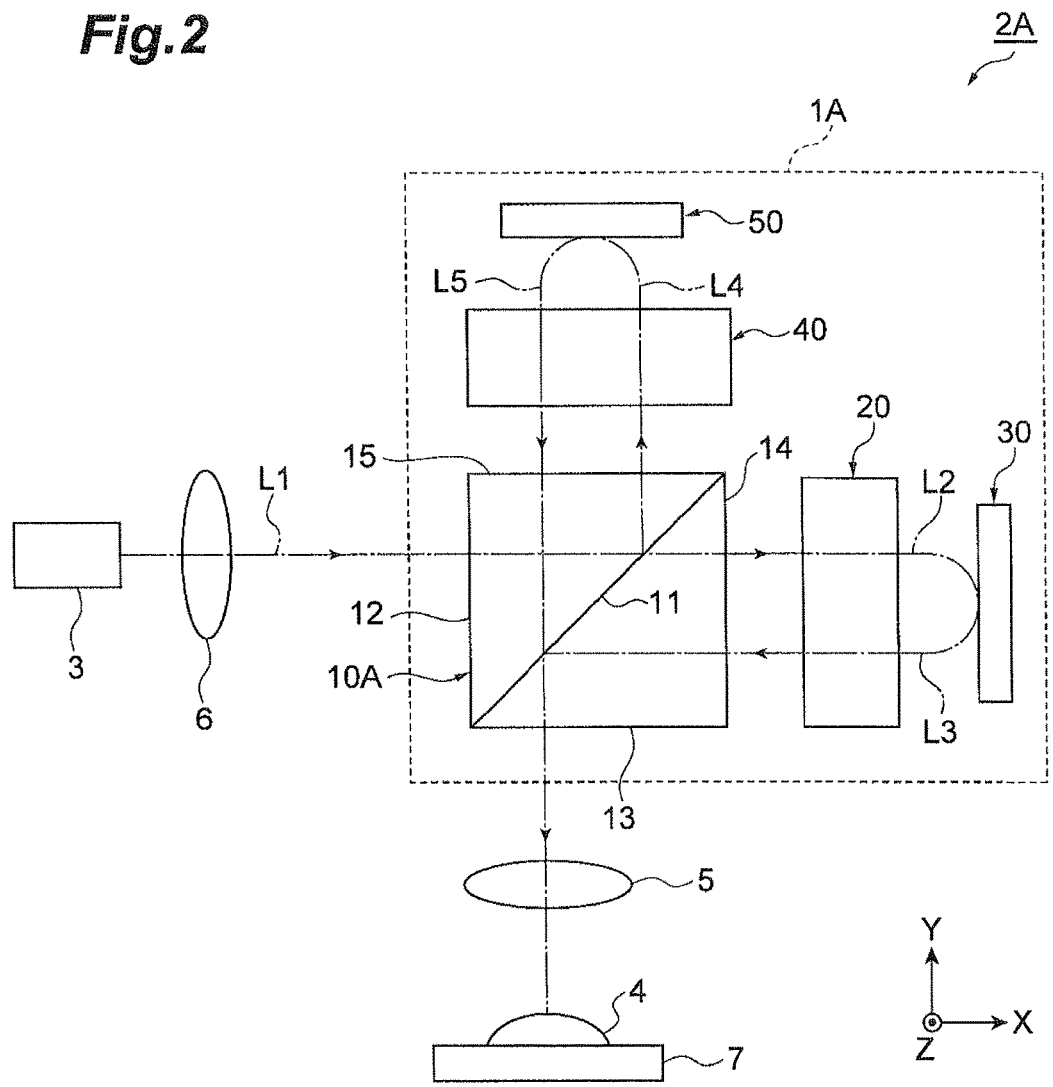
FIG. 2 is a diagram illustrating a configuration of a light irradiation apparatus including the optical module of the first embodiment.

FIG. 1 is a diagram illustrating a configuration of an optical module 1A according to a first embodiment of the present invention. Further, FIG. 2 is a diagram illustrating a configuration of a light irradiation apparatus 2A including the optical module 1A. Further, for ease of understanding, an XYZ orthogonal coordinate system is shown together in FIGS. 1 and 2. Further, in FIGS. 1 and 2, for ease of understanding, an optical axis of light L2 and an optical axis of light L3 are separate, but the optical axis of the light L2 and the optical axis of the light L3 actually partially overlap. The same applies to light L4 and light L5.

As illustrated in FIG. 1, the optical module 1A includes a polarization beam splitter 10A, a first polarization element 20, a first reflective SLM 30, a second polarization element 40, and a second reflective SLM 50.

The polarization beam splitter 10A is an optical part having a light splitting surface 11. The light splitting surface 11 is inclined with respect to both of a first direction (an X-axis direction in this embodiment) and a second direction (a Y-axis direction in this embodiment) intersecting the first direction, and its inclination angle is, for example, 45°. The light splitting surface 11 reflects an s-polarization component included in light input from these directions, and transmits a p-polarization component. The light splitting surface 11 receives the irradiation light L1 which is input from the outside of the optical module 1A along the X-axis direction. This irradiation light L1 is light including both of the p-polarization component and the s-polarization component and is, for example, light of linear polarization, non-polarization (random polarization), circular polarization, or elliptical polarization that is neither the p-polarization nor the s-polarization, or light in which light of the s-polarization having a different wavelength from the light of the p-polarization overlaps the light of the p-polarization.

Further, a cross-sectional shape of the polarization beam splitter 10A along an XY plane is a rectangular shape. Also, the polarization beam splitter 10A includes a light input surface 12, a light output surface 13, a first surface 14, and a second surface 15 appearing in this cross section. The light input surface 12 is along a plane intersecting the X-axis direction, and receives the irradiation light L1. The light output surface 13 is along a plane intersecting the Y-axis direction, and outputs combined modulation light L6. The first surface 14 is along the plane intersecting the X-axis direction, and the light input surface 12 and the first surface 14 are arranged side by side in the X-axis direction. The second surface 15 is along a plane intersecting the Y-axis direction, and the light output surface 13 and the second surface 15 are arranged side by side in the Y-axis direction. Among the four surfaces, the light input surface 12 and the second surface 15 are arranged on one surface side of the light splitting surface 11, and the light output surface 13 and the first surface 14 are arranged on the other surface side of the light splitting surface 11.

The first polarization element 20 is optically coupled to the first surface 14 of the polarization beam splitter 10A, and is arranged on an optical path of a first polarization component L2 transmitted through the light splitting surface 11 in the irradiation light L1 (a p-polarization component at a time at which the irradiation light L1 is transmitted through the light splitting surface 11). Further, the optical path of the first polarization component L2 refers to an optical path of the light transmitted through the light splitting surface 11 in the irradiation light L1. The first polarization element 20 of this embodiment is arranged beside the light splitting surface 11 of the polarization beam splitter 10A in the X-axis direction. The first polarization element 20 has nonreciprocal optical activity for rotating the polarization plane of the first polarization component L2. Here, the nonreciprocal optical activity is a polarization characteristic in which a direction of rotation of light traveling in a forward direction and a direction of rotation of light traveling in an opposite direction are the same as each other. For example, when the polarization plane of the light passing through the first polarization element 20 from any direction is rotated a predetermined angle (for example, 45° or 135°) in a predetermined direction, the polarization plane of light passing through the first polarization element 20 from an opposite direction is further rotated the same angle in the above predetermined direction. For example, when the predetermined angle is 45° and light reciprocates through the first polarization element 20, the polarization plane of the light is rotated 90°. The first polarization element 20 preferably includes a Faraday rotator in one example.

Further, while a ½-wavelength plate including an optical crystal also rotates the polarization plane of the passing light, the ½-wavelength plate has reciprocal optical activity that the rotation direction of light traveling in the forward direction and the rotation direction of the light traveling in the opposite direction are opposite to each other, and thus, when the light reciprocates, the polarization plane of the light returns to an original state. Therefore, the ½-wavelength plate is not a polarization element having nonreciprocal optical activity, and is not used as the first polarization element 20.

The first reflective SLM 30 modulates the first polarization component L2 passing through the first polarization element 20 to generate first modulation light L3, and reflects the first modulation light L3 to the first polarization element 20. Various SLMs such as a phase modulation SLM, an intensity modulation (amplitude modulation) SLM, or a polarization modulation SLM are applied as the first reflective SLM 30. The first reflective SLM 30 has a modulation surface 31 including a plurality of one-dimensionally or two-dimensionally arranged areas (pixels). The first reflective SLM 30 modulates the phase, the strength or the like of the first polarization component L2 in each of the plurality of areas to generate the first modulation light L3. In one example, the first reflective SLM 30 is an LCOS (Liquid Crystal on Silicon) SLM having parallel-aligned nematic liquid crystal. The first reflective SLM 30 is not limited to an electrically addressed liquid crystal element and may be, for example, an optically addressed liquid crystal element, an element having an electro-optical effect material other than liquid crystal, an element including a number of micro mirrors, or a deformable mirror type optical modulator.

The second polarization element 40 is optically coupled to the second surface 15 of the polarization beam splitter 10A, and is arranged on the optical path of the second polarization component L4 reflected by the light splitting surface 11 in the irradiation light L1 (the s-polarization component at a time at which the irradiation light L1 is reflected by the light splitting surface 11). The second polarization element 40 of this embodiment is arranged beside the light splitting surface 11 of the polarization beam splitter 10A in the Y-axis direction. The second polarization element 40 has nonreciprocal optical activity for rotating the polarization plane of the second polarization component L4. Further, the definition of the nonreciprocal optical activity is the same as that in the first polarization element 20 described above. The second polarization element 40 preferably includes a Faraday rotator in one example.

The second reflective SLM 50 modulates the second polarization component L4 that has passed the second polarization element 40 to generate second modulation light L5, and reflects the second modulation light L5 to the second polarization element 40. Various SLMs such as a phase modulation SLM, an intensity modulation (amplitude modulation) SLM, or a polarization modulation SLM are applied as the second reflective SLM 50, similarly to the first reflective SLM 30. The second reflective SLM 50 has a modulation surface 51 including a plurality of one-dimensionally or two-dimensionally arranged areas (pixels). The second reflective SLM 50 modulates a phase, strength or the like of the second polarization component L4 in each of the plurality of areas to generate the second modulation light L5. In one example, the second reflective SLM 50 is an LCOS type SLM having parallel-aligned nematic liquid crystal. The second reflective SLM 50 is not limited to an electrically addressed liquid crystal element and may be, for example, an optically addressed liquid crystal element, an element having an electro-optical effect material other than liquid crystal, an element including a number of micro mirrors, or a deformable mirror type optical modulator.

Further, when the reflective SLMs 30 and 50 are LCOS type SLMs, only a linear polarization component of which a vibration direction is parallel to an alignment direction of the liquid crystal is modulated, and thus the reflective SLMs 30 and 50 may be arranged according to the angle of the polarization plane after the rotation by the polarization elements 20 and 40.

As illustrated in FIG. 2, the light irradiation apparatus 2A of this embodiment includes a light source 3 that outputs the irradiation light L1 to the optical module 1A, and a light-guiding optical system 5 that guides combined modulation light L6 output from the optical module 1A to an irradiation target 4, in addition to the above-described optical module 1A. The light source 3 outputs the irradiation light L1 which includes both the p-polarization component and the s-polarization component. As described above, the irradiation light L1 is light of non-polarization (random polarization), circular polarization, or elliptical polarization. The irradiation light L1 output from the light source 3 is guided to the light input surface 12 of the polarization beam splitter 10A via a light-guiding optical system 6 including a lens. The light-guiding optical system 5 includes an objective lens for gathering the combined modulation light L6 toward the irradiation target 4 which is placed on a stage 7.

Operations of the optical module 1A and the light irradiation apparatus 2A having the above configuration will be described. The irradiation light L1 output from the light source 3 passes through the light-guiding optical system 6 and reaches the polarization beam splitter 10A. In the irradiation light L1 input to the light input surface 12 of the polarization beam splitter 10A in the X-axis direction, the first polarization component L2 is transmitted through the light splitting surface 11 and output from the first surface 14. Further, the second polarization component L4 is reflected by the light splitting surface 11 and output from the second surface 15. The first polarization component L2 passes through the first polarization element 20, but in this case, the polarization plane of the first polarization component L2 is rotated, for example, 45° or 135° in a predetermined direction from a p-polarization plane by the first polarization element 20. Then, the first polarization component L2 is modulated by the first reflective SLM 30 to be the first modulation light L3, and is simultaneously reflected to the first polarization element 20. The first modulation light L3 passes through the first polarization element 20 again, but in this case, the polarization plane of the first modulation light L3 is rotated, for example, 45° or 135° in the predetermined direction by the first polarization element 20. As a result, the first modulation light L3 mainly includes the s-polarization component (or consists of only the s-polarization component).

On the other hand, the second polarization component L4 passes through the second polarization element 40, but in this case, the polarization plane of the second polarization component L4 is rotated, for example, 45° or 135° in a predetermined direction from the s-polarization plane by the second polarization element 40. Then, the second polarization component L4 is modulated by the second reflective SLM 50 to be the second modulation light L5 and simultaneously reflected to the second polarization element 40. The second modulation light L5 passes through the second polarization element 40 again, but in this case, the polarization plane of the second modulation light L5 is rotated, for example, 45° or 135° in the predetermined direction by the second polarization element 40. As a result, the second modulation light L5 mainly includes the p-polarization component (or consists of only the p-polarization component).

Thereafter, the first modulation light L3 including the s-polarization component is reflected by the polarization beam splitter 10A, and the second modulation light L5 including the p-polarization component is transmitted through the polarization beam splitter 10A. These modulation lights L3 and L5 are combined with each other and output from the light output surface 13 of the polarization beam splitter 10A as combined modulation light L6. The irradiation target 4 is irradiated with the combined modulation light L6 while the combined modulation light L6 is being gathered by the objective lens included in the light-guiding optical system 5.

Effects obtained by the optical module 1A and the light irradiation apparatus 2A of this embodiment described above will be described. In the optical module 1A, the p-polarization component (first polarization component L2) and the s-polarization component (second polarization component L4) of the irradiation light L1 can be separated and then modulated, and the first and second modulation light L3 and L5 after modulation can be combined and output. Therefore, according to the optical module 1A of is embodiment, different modulation patterns can be applied to the first and second modulation light L3 and L5. Accordingly, for example, two radiation patterns having a different light phase distribution or light intensity distribution within a plane perpendicular to the optical axis can be combined and output, a different gathering depth can be applied to each polarization component, or irradiation conditions such as a pulse width or a repetition frequency can be different for each polarization component. Alternatively, it is possible to correct aberrations independently for each polarization component. Thus, according to the optical module 1A and the light irradiation apparatus 2A of this embodiment, for example, it is possible to provide a user with a wider variety of irradiation forms than those in the conventional apparatuses as described in Patent Literatures 1 and 2. Further, since the first and second individually modulated modulation light L3 and L5 is combined and output, it is possible to reduce speckles generated in the irradiation light for the irradiation target 4 (combined modulation light L6). Further, in this embodiment, the first reflective SLM 30 and the second reflective SLM 50 may present the same modulation pattern.

Further, in some cases, only the linear polarization component is modulated by a configuration of the SLM of, for example, a liquid crystal type. In such cases, when other polarization components are not used, for example, as in the configuration described in Patent Literatures 1 and 2, light use efficiency (a ratio of intensity of the light output from the light source and intensity of light with which the irradiation target is irradiated) is suppressed to be small. On the other hand, according to the optical module 1A and the light irradiation apparatus 2A of this embodiment, since both the s-polarization component and the p-polarization component of the irradiation light L1 can be effectively utilized, it is possible to effectively increase the light use efficiency. Thus, for example, even when an inexpensive random polarization source is used, the irradiation target 4 can be irradiated with a sufficient amount of light.

Further, in the optical module 1A, the two reflective SLMs 30 and 50 are arranged around one polarization beam splitter 10A. Also, the light (first polarization component L2) input to the first reflective SLM 30 is input from the polarization beam splitter 10A, and the light after modulation (first modulation light L3) is reflected to the polarization beam splitter 10A. Similarly, light (first polarization component L3) input to the second reflective SLM 50 is input from the polarization beam splitter 10A, and the light after modulation (second modulation light L5) is reflected to the polarization beam splitter 10A. With this configuration, the light can be input and reflected in normal directions of the respective modulation surfaces 31 and 51 of the reflective SLMs 30 and 50, and thus, it is easy to adjust the optical axis and it is possible to increase efficiency of input to the SLM and efficiency of output from the SLM. Further, the optical axis of the irradiation light L1 and the optical axis of the combined modulation light L6 can be caused to be orthogonal rather than oblique, and thus it is possible to facilitate a connection to another optical system and to reduce generation of aberrations. Further, since the light in a part of the optical path is caused to reciprocate, it is possible to simplify and miniaturize the configuration of the entire optical system.

In the optical module 1A of this embodiment, when the first and second reflective SLMs 30 and 50 are liquid crystal types, only a linear polarization component of which the vibration direction is parallel to the alignment direction of the liquid crystal is modulated as described above. Therefore, it is preferable for the first and second reflective SLMs 30 and 50 to be arranged so that the alignment direction of the liquid crystal of the first reflective SLM 30 is orthogonal to the alignment direction of the liquid crystal of the second reflective SLM 50. Thus, the first and second polarization components L2 and L4 of which the polarization planes are orthogonal to each other can be effectively modulated in the first and second reflective SLMs 30 and 50, respectively.

First Modification Example

Figure 3:
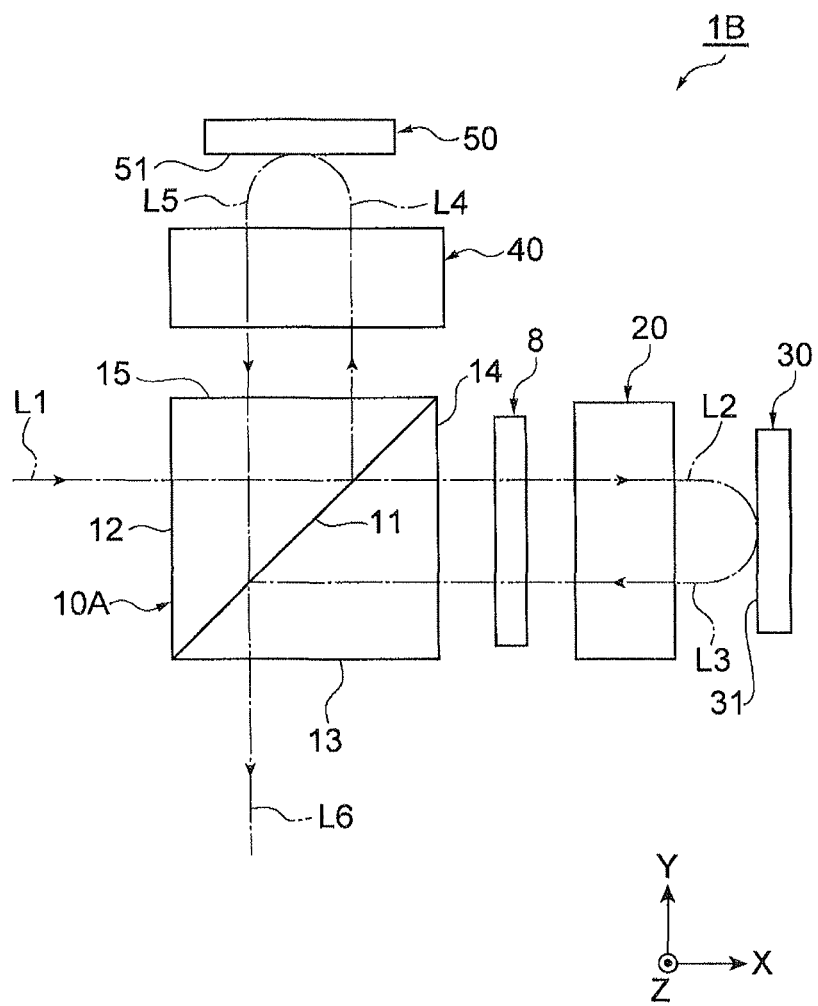
FIG. 3 is a diagram illustrating a configuration of an optical module according to a first modification example of the first embodiment.

FIG. 3 is a diagram illustrating a configuration of an optical module 1B according to a modification example of the above embodiment. The optical module 1B of this modification example further includes a ½-wavelength plate 8 that is a polarization element having reciprocal optical activity, in addition to the configuration of the optical module 1A of the above embodiment. In this modification example, the ½-wavelength plate 8 is arranged on an optical path between the polarization beam splitter 10A and the first reflective SLM 30. An example in which the ½-wavelength plate 8 is arranged on an optical path between the polarization beam splitter 10A and the first polarization element 20 is illustrated in FIG. 3.

In this example, the first polarization component L2 transmitted through the light splitting surface 11 of the polarization beam splitter 10A passes through the ½-wavelength plate 8. In this case, the polarization plane of the first polarization component L2 is rotated 90° in a certain rotation direction from a p-polarization plane by the ½-wavelength plate 8. Then, the first polarization component L2 reciprocates between the first polarization element 20 and the first reflective SLM 30 to be the first modulation light L3, and passes through the ½-wavelength plate 8 again. In this case, the polarization plane of the first modulation light L3 is rotated 90° in a direction opposite to the above direction by the ½-wavelength plate 8. As a result, the polarization plane of the first modulation light L3 when the first modulation light L3 is input to the polarization beam splitter 10A is the same as that in the first embodiment.

In this modification example, the polarization plane of the first polarization component L2 is rotated 90° when the first polarization component L2 is input to the first reflective SLM 30. Accordingly, the angle of the polarization plane of the first polarization component L2 immediately before the first polarization component L2 is input to the first reflective SLM 30 can be arbitrarily controlled. Thus, for example, when the first and second reflective SLMs 30 and 50 are liquid crystal SLMs, an alignment direction of liquid crystal of the first reflective SLM 30 can be arbitrarily set. Accordingly, for example, the alignment direction of the liquid crystal of the first reflective SLM 30 and the alignment direction of the liquid crystal of the second reflective SLM 50 can be aligned (parallelized to each other), and control of the first and second reflective SLMs 30 and 50 can be common to modulation data input to the first and second reflective SLMs 30 and 50.

Further, the ½-wavelength plate 8 may be arranged on the optical path between the first polarization element 20 and the first reflective SLM 30 or may be arranged on the optical path between the polarization beam splitter 10A and the second reflective SLM 50 (between the polarization beam splitter 10A and the second polarization element 40 or between the second polarization element 40 and the second reflective SLM 50). When the ½-wavelength plate 8 is arranged on the optical path between the polarization beam splitter 10A and the second reflective SLM 50, an angle of the polarization plane of the second polarization component L4 immediately before the second polarization component L4 is input to the second reflective SLM 50 can be arbitrarily controlled, and it is possible to achieve the same effects as described above. Further, a beam scanner that changes a traveling direction of the beam may be included in the light-guiding optical system 5.

Second Embodiment

Figure 4:
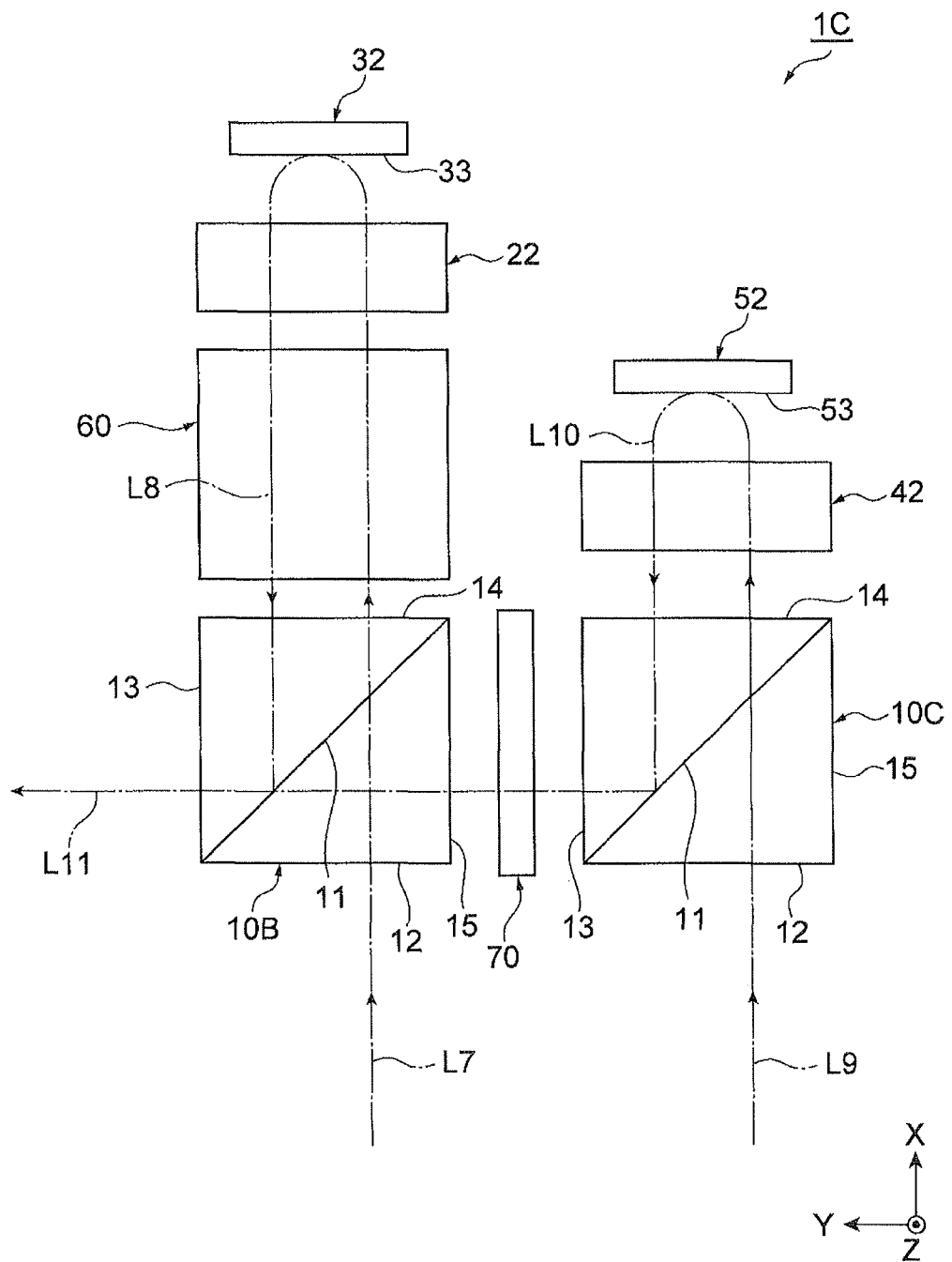
FIG. 4 is a diagram illustrating a configuration of an optical module according to a second embodiment of the present invention.
Figure 5:
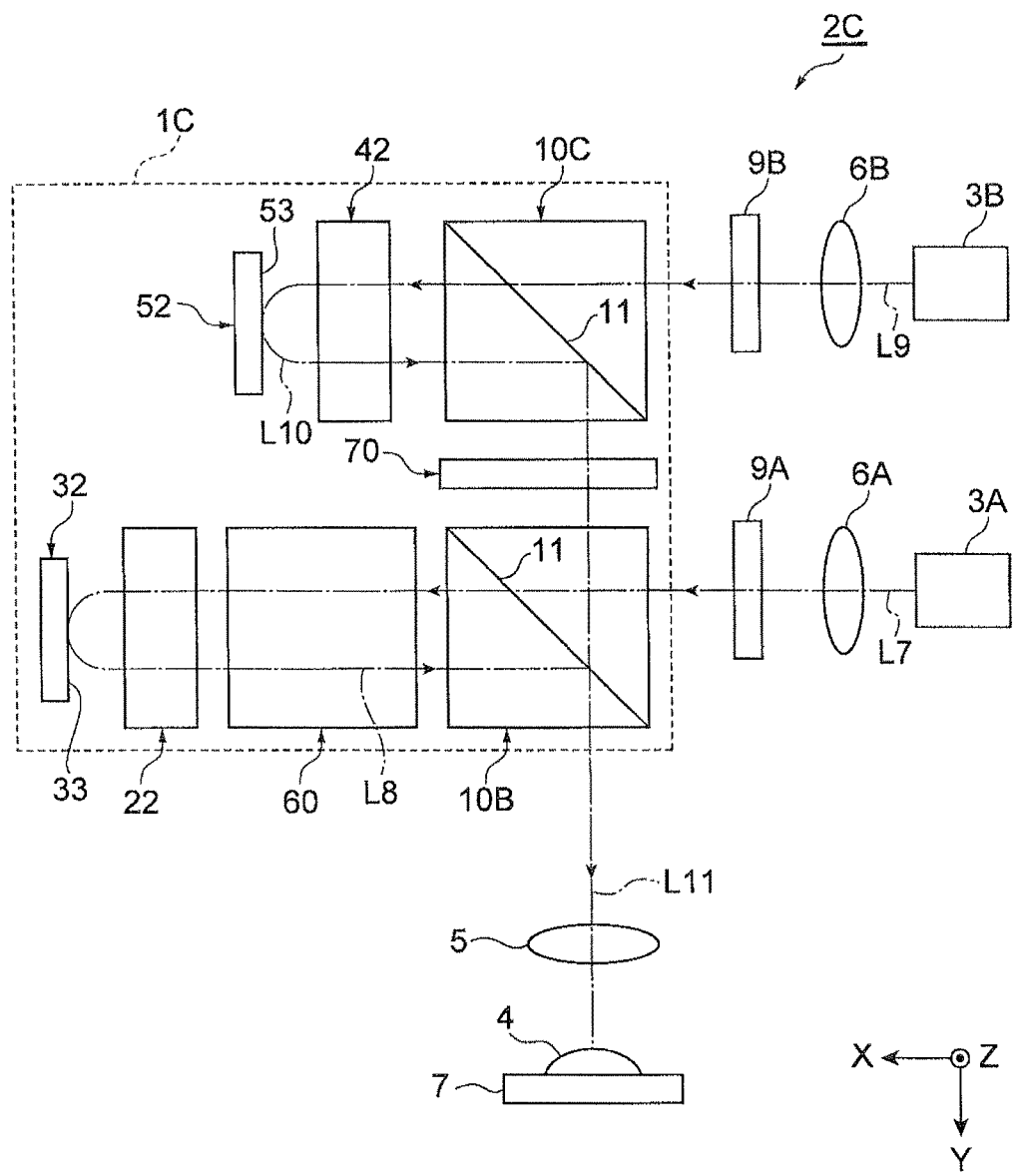
FIG. 5 is a diagram illustrating a configuration of a light irradiation apparatus including the optical module of the second embodiment.

FIG. 4 is a diagram illustrating a configuration of an optical module 1C according to a second embodiment of the present invention. Further, FIG. 5 is a diagram illustrating a configuration of a light irradiation apparatus 2C including the optical module 1C. Further, for ease of understanding, an XYZ orthogonal coordinate system is also illustrated in FIGS. 4 and 5. Further, in FIGS. 4 and 5, for ease of understanding, optical axes of light L7 and light L8 are apart from each other, but in fact, the optical axis of the light L7 and the optical axis of the light L8 partially overlap. The same applies to light L9 and light L10.

As illustrated in FIG. 4, the optical module 1C includes a first polarization beam splitter 10B, a second polarization beam splitter 10C, a first polarization element 22, a first reflective SLM 32, a second polarization element 42, a second reflective SLM 52, an optical path length adjustment element 60, and a ½-wavelength plate 70.

The first and second polarization beam splitters 10B and 10C have the same configuration as the polarization beam splitter 10A of the first embodiment. That is, the first and second polarization beam splitters 10B and 10C include a light splitting surface 11 that reflects the s-polarization component of the input light and transmits the p-polarization component, a light input surface 12, a light output surface 13, a first surface 14, and a second surface 15. The first polarization beam splitter 10B receives first irradiation light L7 including the p-polarization component using the light splitting surface 11. The second polarization beam splitter 10C receives second irradiation light L9 including the p-polarization component using the light splitting surface 11. The first and second polarization beam splitters 10B and 10C are arranged side by side in the Y-axis direction so that the second surface 15 of the first polarization beam splitter 10B is optically coupled to the light output surface 13 of the second polarization beam splitter 10C. The ½-wavelength plate 70 that is a polarization element having reciprocal optical activity is provided on an optical path between the first polarization beam splitter 10B and the second polarization beam splitter 10C.

The first polarization element 22 is optically coupled to the first surface 14 of the polarization beam splitter 10B, and is arranged on the optical path of the first irradiation light L7 transmitted through the light splitting surface 11. The first polarization element 22 of this embodiment is arranged beside the light splitting surface 11 of the polarization beam splitter 10B in the X-axis direction. The first polarization element 22 has nonreciprocal optical activity for rotating the polarization plane of the first irradiation light L7. A definition of the nonreciprocal optical activity is the same as in the first embodiment. The first polarization element 22 preferably includes a Faraday rotator in one example.

The first reflective SLM 32 modulates the first irradiation light L7 which has passed through the first polarization element 22 to generate first modulation light L8, and reflects the first modulation light L8 to the first polarization element 22. Various SLMs such as a phase modulation SLM, an intensity modulation (amplitude modulation) SLM, or a polarization modulation SLM are applied as the first reflective SLM 32, similarly to the first reflective SLM 30 of the first embodiment. The first reflective SLM 32 has a modulation surface 33 including a plurality of one-dimensionally or two-dimensionally arranged areas (pixels). The first reflective SLM 32 modulates a phase, strength or the like of the first irradiation light L7 in each of the plurality of areas to generate the first modulation light L8.

The optical path length adjustment element 60 is provided on the optical path between the first polarization beam splitter 10B and the first reflective SLM 32, and adjusts an optical path length of the first irradiation light L7 and the first modulation light L8. In one example, the length of the optical path length adjustment element 60 is set so that the optical path length of the first irradiation light L7 and the first modulation light L8 is equal to an optical path length of second irradiation light L9 and second modulation light L10 to be described below. Although the optical path length adjustment element 60 is arranged between the first polarization beam splitter 10B and the first polarization element 22 in FIG. 4, the optical path length adjustment element 60 may be arranged between the first polarization element 22 and the first reflective SLM 32.

The second polarization element 42 is optically coupled to the first surface 14 of the polarization beam splitter 10C and is arranged on an optical path of the second irradiation light L9 transmitted through the light splitting surface 11. The second polarization element 42 of this embodiment is arranged beside the light splitting surface 11 of the polarization beam splitter 10C in the X-axis direction. The second polarization element 42 has nonreciprocal optical activity for rotating the polarization plane of the second irradiation light L9. Further, a definition of the nonreciprocal optical activity is the same as in the first embodiment. The second polarization element 42 preferably includes a Faraday rotator in one example.

The second reflective SLM 52 modulates the second irradiation light L9 which has passed through the second polarization element 42 to generate second modulation light L10, and reflects the second modulation light L10 to the second polarization element 42. Various SLMs such as a phase modulation SLM, an intensity modulation (amplitude modulation) SLM, or a polarization modulation SLM are applied as the second reflective SLM 52, as in the second reflective SLM 50 of the first embodiment. The second reflective SLM 52 has a modulation surface 53 including a plurality of one-dimensionally or two-dimensionally arranged areas (pixels). The second reflective SLM 52 modulates a phase, strength or the like of the second irradiation light L9 in each of the plurality of areas to generate second modulation light L10.

In one example, the first reflective SLM 32 and the second reflective SLM 52 are LCOS type SLMs having parallel-aligned nematic liquid crystal. The reflective SLMs 32 and 52 are not limited to an electrically addressed liquid crystal element and may be, for example, an optically addressed liquid crystal element or a deformable mirror type optical modulator. Further, when the reflective SLMs 32 and 52 are the LCOS type SLMs, only a linear polarization component of which the vibration direction is parallel to an alignment direction of the liquid crystal is modulated, and thus the reflective SLMs 32 and 52 may be arranged according to the angle of the polarization plane after rotation by the polarization elements 22 and 42.

As illustrated in FIG. 5, the light irradiation apparatus 2C of this embodiment includes a light source 3A that outputs the first irradiation light L7 to the optical module 1C, a light source 3B that outputs the second irradiation light L9 to the optical module 1C, and a light-guiding optical system 5 that guides combined modulation light L11 (described below) output from the optical module 1C to the irradiation target 4, in addition to the above-described optical module 1C. The first irradiation light L7 that is output from the light source 3A is guided to the light input surface 12 of the polarization beam splitter 10B via a light-guiding optical system 6A including a lens or the like and a polarization plate (first spectroscopic element) 9A that splits the first irradiation light L7 based on polarization components. Similarly, the second irradiation light L9 output from the light source 3B is guided to the light input surface 12 of the polarization beam splitter 10C via a light-guiding optical system 6B including a lens or the like and a polarization plate (second spectroscopic element) 9B that splits the second irradiation light L9 based on polarization components. The light-guiding optical system 5 includes an objective lens for gathering the combined modulation light L11 toward the irradiation target 4 placed on the stage 7.

Operations of the optical module 1C and the light irradiation apparatus 2C having the above configuration will be described. The first irradiation light L7 that is output from the light source 3A passes through the light-guiding optical system 6A, and the s-polarization component is removed by the polarization plate 9A (first spectroscopic element) (that is, only the p-polarization component is transmitted). Then, the first irradiation light L7 reaches the polarization beam splitter 10B, is transmitted through the light splitting surface 11, and is output from the first surface 14. While the first irradiation light L7 passes through the first polarization element 22, the polarization plane of the first irradiation light L7 in this case is rotated, for example, 45° in a predetermined direction from the p-polarization plane by the first polarization element 22. Then, the first irradiation light L7 is modulated by the first reflective SLM 32 to be the first modulation light L8 and is simultaneously reflected to the first polarization element 22. The first modulation light L8 passes through the first polarization element 22 again, but in this case, the polarization plane of the first modulation light L8 is rotated, for example, 45° in the above predetermined direction by the first polarization element 22. As a result, the first modulation light L8 mainly includes the s-polarization component (or consists of only the s-polarization component).

On the other hand, the second irradiation light L9 output from the light source 3B passes through the light-guiding optical system 6B, and the s-polarization component is removed by the polarization plate (second spectroscopic element) 9B (that is, only the p-polarization component is transmitted). Then, the second irradiation light L9 reaches the polarization beam splitter 10C, is transmitted through the light splitting surface 11, and is output from the first surface 14. This second irradiation light L9 passes through the second polarization element 42, but in this case, the polarization plane of the second irradiation light L9 is rotated, for example, 45° in a predetermined direction from the p-polarization plane by the second polarization element 42. Then, the second irradiation light L9 is modulated by the second reflective SLM 52 to be the second modulation light L10, and is simultaneously reflected to the second polarization element 42. The second modulation light L10 passes through the second polarization element 42 again, but in this case, the polarization plane of the second modulation light L10 is rotated, for example, 45° in the above predetermined direction by the second polarization element 42. As a result, the second modulation light L10 mainly includes the s-polarization component (or consists of only the s-polarization component).

Then, the first modulation light L8 including the s-polarization component is reflected by the light splitting surface 11 of the polarization beam splitter 10B. Further, the second modulation light L10 including the s-polarization component is reflected by the light splitting surface 11 of the polarization beam splitter 10C, passes through the ½-wavelength plate 70, and then reaches the light splitting surface 11 of the polarization beam splitter 10B. When the second modulation light L10 passes through the ½-wavelength plate 70, the polarization plane of the second modulation light L10 is rotated, for example, 90° in a certain rotation direction from the s-polarization plane. Therefore, the second modulation light L10 mainly includes a p-polarization component (or consists of only the p-polarization component), and is transmitted through the light splitting surface 11 of the polarization beam splitter 10B. Also, the modulation light L8 and L10 is combined and output from the light output surface 13 of the polarization beam splitter 10B as combined modulation light L11. The irradiation target 4 is irradiated with the combined modulation light L11 while the combined modulation light L11 is being gathered by the objective lens included in the light-guiding optical system 5.

According to the optical module 1C and the light irradiation apparatus 2C of this embodiment described above, it is possible to obtain the same effects as those of the optical module 1A and the light irradiation apparatus 2A of the first embodiment described above. That is, in this embodiment, it is possible to modulate the first irradiation light L7 and the second irradiation light L9, combine the first and second modulation light L8 and L10 after modulation, and output resultant light. Therefore, according to the optical module 1C and the light irradiation apparatus 2C of this embodiment, different modulation patterns can be applied to the first and second modulation light L8 and L10. Thus, it is possible to provide a user with a wider variety of irradiation forms, as in the first embodiment. Further, in this embodiment, the first reflective SLM 32 and the second reflective SLM 52 may also present the same modulation pattern.

Further, in the optical module 1C, the light (first irradiation light L7) input to the first reflective SLM 32 is input from the polarization beam splitter 10B, and the light after modulation (the first modulation light L8) is reflected to the polarization beam splitter 10B. Further, the light (second irradiation light L9) input to the second reflective SLM 52 is input from the polarization beam splitter 10C, and the light after modulation (second modulation light L10) is reflected to the polarization beam splitter 10C. With this configuration, the light can be input and reflected in normal directions of the respective modulation surfaces 33 and 53 of the reflective SLMs 32 and 52, and thus it is easy to adjust the optical axis and it is possible to increase efficiency of input to the SLM and efficiency of output from the SLM. Further, the optical axes of the first and second irradiation light L7 and L9 and the optical axis of the combined modulation light L11 can be caused to be orthogonal rather than oblique, and thus it is possible to facilitate a connection to another optical system and to reduce generation of aberrations. Further, since the light in a part of the optical path is caused to reciprocate, it is possible to simplify and miniaturize the configuration of the entire optical system.

Further, it is preferable that a polarization element having reciprocal optical activity (for example, the ½-wavelength plate 70) be provided on the optical path between the first polarization beam splitter 10B and the second polarization beam splitter 10C, as in this embodiment. Accordingly, the polarization plane of the second modulation light L10 including the s-polarization component reflected by the light splitting surface 11 of the second polarization beam splitter 10C can be rotated so that the p-polarization component is included and the second modulation light L10 can be preferably transmitted through the light splitting surface 11 of the first polarization beam splitter 10B. Further, accordingly, the light distribution direction of the liquid crystal of the first reflective SLM 32 and the light distribution direction of the liquid crystal of the second reflective SLM 52 can be aligned (can be parallel to each other), and control of the first and second reflective SLMs 32 and 52 for the modulation data input to each of the first and second reflective SLMs 32 and 52 can be common.

Further, at least one of the polarization plates 9A and 9B may be replaced with a ½-wavelength plate. In this case, the light source may output irradiation light including an s-polarization component. Further, a beam scanner that changes a traveling direction of the beam may be included in the light-guiding optical system 5.

Second Modification Example

Figure 6:
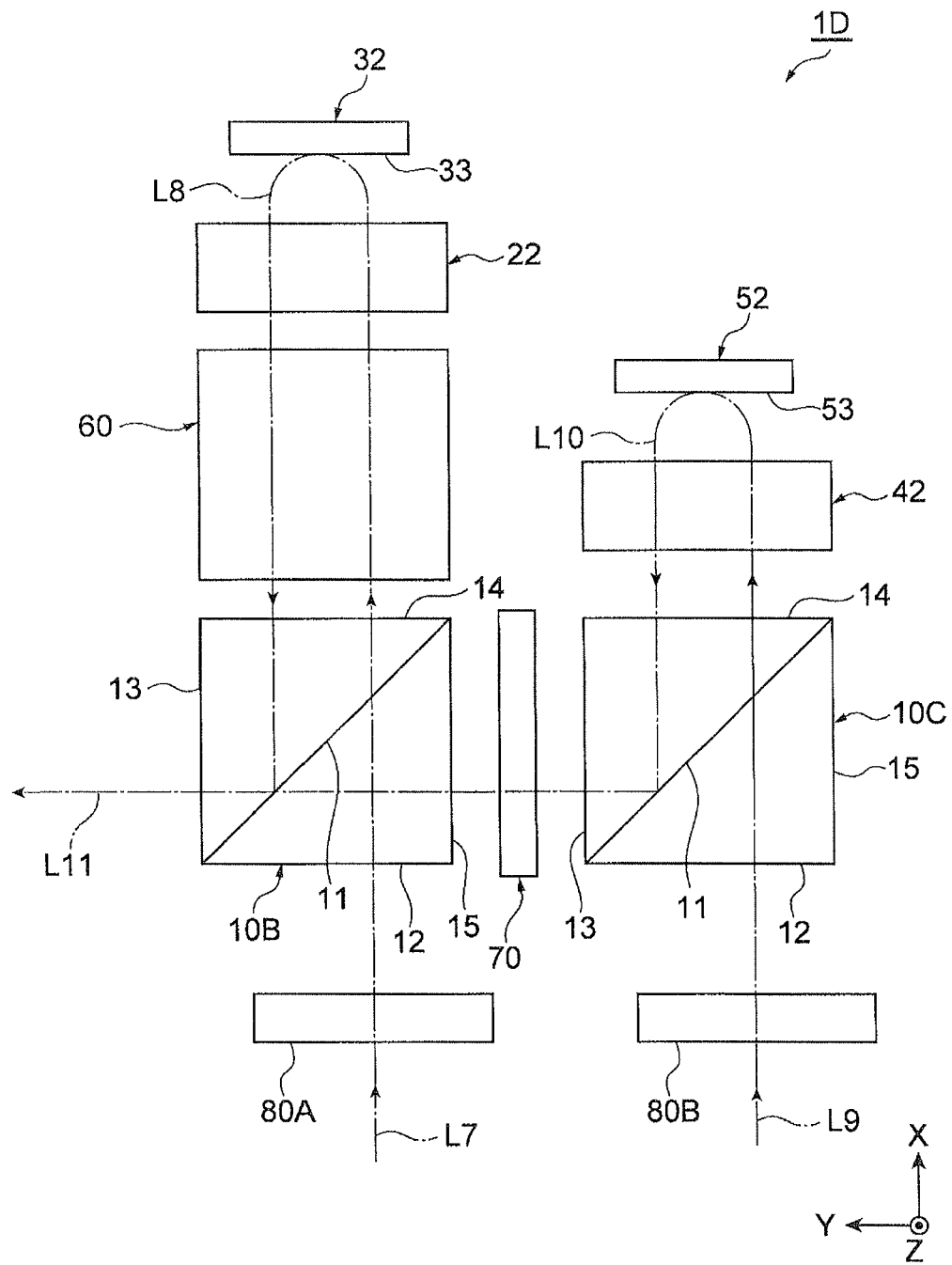
FIG. 6 is a diagram illustrating a configuration of an optical module according to a second modification example of the second embodiment.

FIG. 6 is a diagram illustrating a configuration of an optical module 1D according to a modification example of the above embodiment. The optical module 1D of this modification example further includes wavelength filters 80A and 80B, in addition to the configuration of the optical module 1C of the above embodiment. In this modification example, the wavelength filter (first spectroscopic element) 80A is arranged on an optical path of the first irradiation light L7 input to the polarization beam splitter 10B, and splits the first irradiation light L7 based on wavelength components. Further, the wavelength filter (second spectroscopic element) 80B is arranged on an optical path of the second irradiation light L9 input to the polarization beam splitter 10C, and splits the second irradiation light L9 based on wavelength components.

In this modification example, the first irradiation light L7 in a first wavelength range is input to the polarization beam splitter 10B, and the second irradiation light L9 in a second wavelength range different from the first wavelength range is input to the polarization beam splitter 10C. Therefore, the first modulation light L8 constituting the combined modulation light L11 is light included in the first wavelength range, and the second modulation light L10 is light included in the second wavelength range. Also, the wavelength filter 80A transmits the light in the first wavelength range and blocks light in the second wavelength range, and the wavelength filter 80B transmits the light in the second wavelength range and blocks the light in the first wavelength range. Further, a polarization beam splitter corresponding to the first wavelength range is used as the polarization beam splitter 10B, and a polarization beam splitter corresponding to the second wavelength range is used as the polarization beam splitter 10C. Further, it is more preferable for transmittance of the polarization beam splitter 10B in the second wavelength range to be high.

According to the optical module 1D of this modification example, the first and second modulation light L8 and L10 having different polarization components and different wavelengths can be combined and output. Further, by providing the wavelength filters 80A and 80B, it is possible to prevent the first irradiation light L7 from the light source outputting the first irradiation light L7 and the second irradiation light L9 from the light source outputting the second irradiation light L9 from being input to each other.

Third Embodiment

Figure 7:
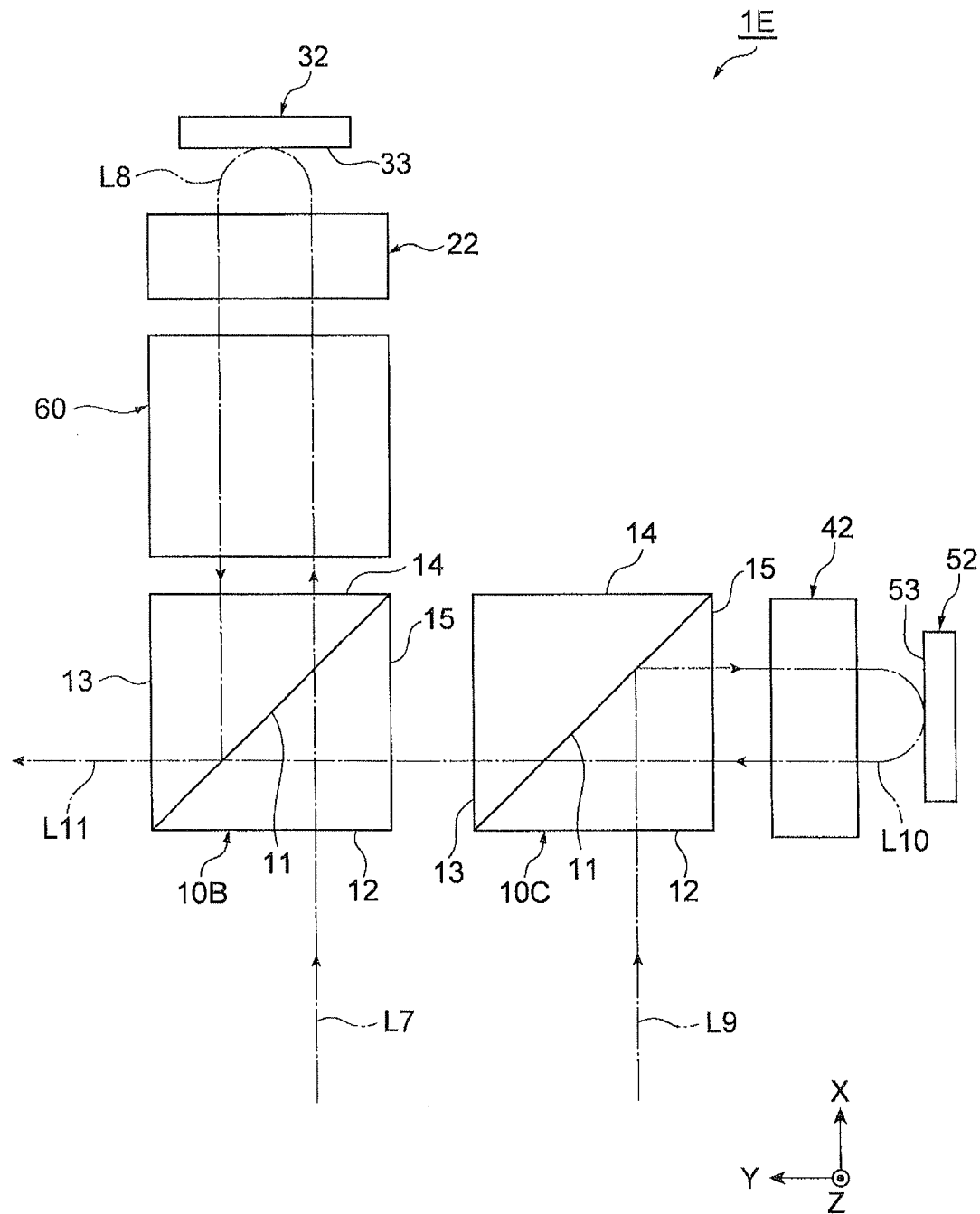
FIG. 7 is a diagram illustrating a configuration of an optical module according to a third embodiment of the present invention.
Figure 8:
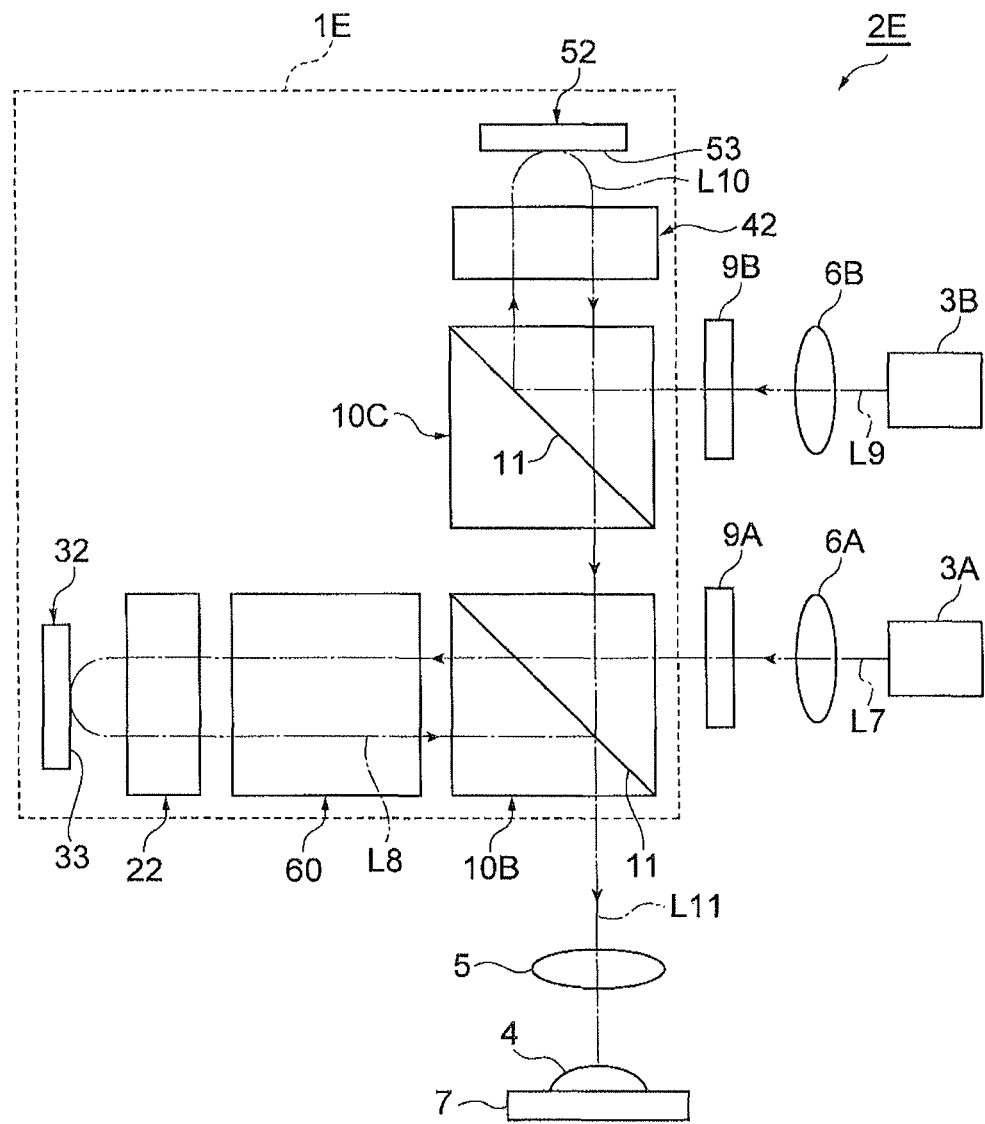
FIG. 8 is a diagram illustrating a configuration of a light irradiation apparatus including the optical module of the third embodiment.

FIG. 7 is a diagram illustrating a configuration of an optical module 1E according to a third embodiment of the present invention. Further, FIG. 8 is a diagram illustrating a configuration of a light irradiation apparatus 2E including the optical module 1E. The optical module 1E of this embodiment is different from the optical module 1C of the second embodiment in an arrangement of the second polarization element 42 and the second reflective SLM 52 and omission of the ½-wavelength plate 70.

In this embodiment, the p-polarization component is removed from the second irradiation light L9 (that is, only the light of the s-polarization component is transmitted) in a polarization plate (second spectroscopic element) 9B. Also, the second polarization element 42 is optically coupled to a second surface 15 of the second polarization beam splitter 10C, and is arranged on an optical path of the second irradiation light L9 reflected by the light splitting surface 11 of the second polarization beam splitter 10C. The second polarization element 42 of this embodiment is arranged beside the light splitting surface 11 of the polarization beam splitter 10C in the Y-axis direction. The second reflective SLM 52 modulates the second irradiation light L9 which has passed through the second polarization element 42 to generate second modulation light L10, and reflects the second modulation light L10 to the second polarization element 42.

In the above configuration, the second irradiation light L9 including the s-polarization component reflected by the light splitting surface 11 of the second polarization beam splitter 10C passes through the second polarization element 42. In this case, the polarization plane of the second irradiation light L9 is rotated, for example, 45° in a predetermined direction from the s-polarization plane by the second polarization element 42. Then, the second irradiation light L9 is modulated by the second reflective SLM 52 to be the second modulation light L10, and is simultaneously reflected to the second polarization element 42. While the second modulation light L10 passes through the second polarization element 42 again, the polarization plane of the second modulation light L10 in this case is rotated, for example, 45° in the above predetermined direction by the second polarization element 42. As a result, the second modulation light L10 mainly includes a p-polarization component (or consists of only the p-polarization component). Then, the second modulation light L10 including the p-polarization component is transmitted through the light splitting surface 11 of the first polarization beam splitter 10B, combined with the first modulation light L8, and output as combined modulation light L11 from the light output surface 13 of the polarization beam splitter 10B.

According to the light irradiation apparatus 2E including the optical module 1E of this embodiment, different modulation patterns can be applied to the first and second modulation light L8 and L10, and thus a variety of irradiation forms can be provided to the user, as in the second embodiment. Further, light can be input and reflected in normal directions of the respective modulation surface 33 and 53 of the reflective SLMs 32 and 52, and thus it is easy to adjust the optical axis, and it is possible to increase efficiency of input to the SLM, and efficiency of output from the SLM. Further, the optical axes of the first and second irradiation light L7 and L9 and the optical axis of the combined modulation light L11 can be caused to be orthogonal rather than oblique, and thus it is possible to facilitate a connection to another optical system and to reduce generation of aberrations. Further, since the light is caused to reciprocate in a part of the optical path, it is possible to simplify and miniaturize the configuration of the entire optical system.

The optical module and the light irradiation apparatus according to the present invention are not limited to the above embodiments, and various other modifications are possible. For example, the polarization beam splitter having a rectangular section is used in the above embodiments, but the shape of the polarization beam splitter is not limited thereto, and may be, for example, a plate shape. Further, while the light is input and output vertically with respect to the reflective SLM in the above embodiments, input and reflection angles with respect to the reflective SLM may be greater than 0°.

Further, aberrations are generally generated in an optical system including the SLM. However, in the above embodiments, a pattern for correcting the aberrations may be indicated in the first and second reflective SLMs. By applying such a pattern to a desired phase pattern, it is possible to correct the aberrations. In this case, aberrations generated in the first modulation light and aberrations generated in the second modulation light may be independently obtained, and individually removed in the first and second reflective SLMs.

INDUSTRIAL APPLICABILITY

The present invention can be applied to use of an optical module and a light irradiation apparatus capable of providing a user with a wider variety of irradiation forms.

REFERENCE SIGNS LIST 1A to 1E: optical module, 2A, 2C, and 2E: light irradiation apparatus, 3, 3A, and 3B: light source, 4: irradiation target, 5, 6, 6A, and 6B: light-guiding optical system, 7: stage, 8: ½-wavelength plate, 9A: polarization plate (first spectroscopic element), 9B: polarization plate (second spectroscopic element), 10A: polarization beam splitter, 10B: first polarization beam splitter, 10C: second polarization beam splitter, 11: light splitting surface, 12: light input surface, 13: light output surface, 14: first surface 15: second surface, 20 and 22: first polarization element, 30 and 32: first reflective SLM, 40 and 42: second polarization element, 50 and 52: second reflective SLM, 60: optical path length adjustment element, 70: ½-wavelength plate, 80A: wavelength filter (first spectroscopic element), 80B: wavelength filter (second spectroscopic element), L1: irradiation light, L2: first polarization component, L3 and L8: first modulation light, L4: second polarization component, L5 and L10: second modulation light, L6 and L11: combined modulation light, L7: first irradiation light, L9: second irradiation light.

The invention claimed is:

1. An optical module for modulating irradiation light output from a light source to generate modulation light, the optical module comprising:
   a polarization beam splitter including a light splitting surface configured to reflect an s-polarization component included in the irradiation light and transmit a p-polarization component;
   a first polarization element having nonreciprocal optical activity to rotate a polarization plane, and arranged on an optical path of a first polarization component transmitted through the light splitting surface in the irradiation light;
   a first reflective spatial light modulator configured to modulate the first polarization component passing through the first polarization element to generate first modulation light, and reflect the first modulation light to the first polarization element;
   a second polarization element having nonreciprocal optical activity to rotate a polarization plane, and arranged on an optical path of a second polarization component reflected by the light splitting surface in the irradiation light; and
   a second reflective spatial light modulator configured to modulate the second polarization component passing through the second polarization element to generate second modulation light, and reflect the second modulation light to the second polarization element,
   wherein the first modulation light passing through the first polarization element again and then reflected by the light splitting surface and the second modulation light passing through the second polarization element again and then transmitted through the light splitting surface are combined with each other, output from the polarization beam splitter.

2. The optical module according to claim 1,
   wherein the first and second reflective spatial light modulators are liquid crystal types, and
   an alignment direction of liquid crystal of the first reflective spatial light modulator and an alignment direction of liquid crystal of the second reflective spatial light modulator are orthogonal to each other.

3. The optical module according to claim 1, further comprising:
   a polarization element having reciprocal optical activity, and arranged on an optical path between the polarization beam splitter and the first reflective spatial light modulator or on an optical path between the polarization beam splitter and the second reflective spatial light modulator.

4. A light irradiation apparatus, comprising:
   the optical module according to claim 1;
   a light source configured to output the irradiation light to the optical module; and
   a light-guiding optical system configured to irradiate an irradiation target with the modulation light output from the optical module.

5. An optical module for modulating irradiation light output from a light source to generate modulation light, the optical module comprising:
   a first polarization beam splitter including a light splitting surface configured to reflect an s-polarization component and transmit a p-polarization component, and configured to receive first irradiation light including the p-polarization component;
   a first polarization element having nonreciprocal optical activity to rotate a polarization plane, and arranged on an optical path of the first irradiation light transmitted through the light splitting surface of the first polarization beam splitter;
   a first reflective spatial light modulator configured to modulate the first irradiation light passing through the first polarization element to generate first modulation light, and reflect the first modulation light to the first polarization element;
   a second polarization beam splitter including a light splitting surface configured to reflect the s-polarization component and transmit the p-polarization component, and configured to receive second irradiation light including any one of the s-polarization component and the p-polarization component;
   a second polarization element having nonreciprocal optical activity to rotate a polarization plane, and arranged on an optical path of the second irradiation light subjected to one of transmission and reflection in the light splitting surface of the second polarization beam splitter; and
   a second reflective spatial light modulator configured to modulate the second irradiation light passing through the second polarization element to generate second modulation light, and reflect the second modulation light to the second polarization element,
   wherein the first modulation light passes through the first polarization element again and then is reflected in the light splitting surface of the first polarization beam splitter, and the second modulation light passes through the second polarization element again and then reaches the light splitting surface of the first polarization beam splitter through the other of the transmission and the reflection in the light splitting surface of the second polarization beam splitter, and
   the first and second modulation light is combined, and output from the first polarization beam splitter.

6. The optical module according to claim 5, further comprising:
   an optical path length adjustment element provided on an optical path between the first polarization beam splitter and the first reflective spatial light modulator.

7. The optical module according to claim 5, further comprising:
   a polarization element having reciprocal optical activity and provided on an optical path between the first polarization beam splitter and the second polarization beam splitter.

8. A light irradiation apparatus, comprising:
   the optical module according to claim 5;
   at least one of light source configured to output the first and second irradiation light to the optical module; and
   a light-guiding optical system configured to irradiate an irradiation target with the modulation light output from the optical module.

9. The light irradiation apparatus according to claim 8, further comprising:
   a first spectroscopic element arranged on an optical path of the first irradiation light, and configured to split the first irradiation light based on wavelength components or polarization components; and a second spectroscopic element arranged on an optical path of the second irradiation light, and configured to split the second irradiation light based on wavelength components or polarization components.

10. The light irradiation apparatus according to claim 8, further comprising:

a ½-wavelength plate, wherein the ½-wavelength plate is arranged on at least one of an optical path of the first irradiation light and an optical path of the second irradiation light.

* * * * *